(12) United States Patent
Nakanishi et al.

(10) Patent No.: US 6,814,504 B2
(45) Date of Patent: Nov. 9, 2004

(54) OPTICAL COMMUNICATION DEVICE

(75) Inventors: Hiromi Nakanishi, Osaka (JP); Takeshi Okada, Osaka (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/430,001

(22) Filed: May 6, 2003

(65) Prior Publication Data

US 2003/0223707 A1 Dec. 4, 2003

(30) Foreign Application Priority Data

May 28, 2002 (JP) .......................................... 2002-153870

(51) Int. Cl.[7] .............................................. H04N 5/91
(52) U.S. Cl. ............................................................. 385/92
(58) Field of Search .............................. 385/58, 59, 80, 385/89, 92, 94

(56) References Cited

U.S. PATENT DOCUMENTS

| | | | | |
|---|---|---|---|---|
| 5,519,799 A | * | 5/1996 | Murakami et al. | 385/78 |
| 5,555,332 A | * | 9/1996 | Dean et al. | 385/53 |
| 6,052,500 A | * | 4/2000 | Takano et al. | 385/50 |
| 6,421,493 B1 | * | 7/2002 | Burek et al. | 385/134 |
| 6,450,704 B1 | * | 9/2002 | O'Connor et al. | 385/92 |
| 6,526,206 B2 | * | 2/2003 | Kunkel et al. | 385/52 |
| 6,616,343 B2 | * | 9/2003 | Katsura et al. | 385/55 |
| 6,623,174 B2 | * | 9/2003 | Perko et al. | 385/78 |
| 6,632,024 B2 | * | 10/2003 | Kawase et al. | 385/59 |
| 6,634,800 B2 | * | 10/2003 | Suematsu et al. | 385/80 |
| 6,685,363 B2 | * | 2/2004 | Kryzak | 385/89 |

OTHER PUBLICATIONS

M. Shishikura, N. Nagatsuma, T. Ido, M. Tokuda, K. Nakahara, E. Nomoto, T. Sudoh and H. Sano, "10GbpsX4–challel parallel LD module", Proceeding of the 2001 Communications Society Conference of IEICE, C–3–50, p160 (2001).

* cited by examiner

Primary Examiner—William H. Mayo, III
(74) Attorney, Agent, or Firm—Fish & Richardson P.C.

(57) ABSTRACT

A standard multichannel optical fiber has a pitch 250 μm (P1), whereas mounting of optoelectronic device chips can require a pitch P2 larger than P1. The pitch of element fibers should be enlarged for coupling a multichannel ribbon fiber to a multichannel photodiode (PD) or laser diode (LD) module having photodiodes or laser diodes for M channels. The module includes a connector maintaining M fibers with tails extending backward and a bench having M V-grooves aligned at the larger pitch P2 for receiving the tails of the fibers. M light waveguides are aligned at the pitch P2 following the V-grooves. The module also includes M photodiodes or laser diodes following the light waveguides. A package includes the connector at a front part, the fiber tails at a width enlarging region for converging the pitch from P1 to P2, and the bench at a back part.

18 Claims, 7 Drawing Sheets

Prior Art

Fig. 6

Prior Art

OPTICAL COMMUNICATION DEVICE

BACKGROUND OF THE INVENTION

1. Field of the Invention

This invention relates to an optical communication device (LD module, PD module, LD/PD module) for transmitting and receiving multichannel signals by M-channel ribbonfibers (tapefibers) which contain M element fibers, where M is the number of channels. The pitch of multichannel fibers has been determined to be 250 μm. Optoelectronic device chips, laser diodes or photodiodes, are squares of a side from 600 μm to 300 μm.

Sizes of optoelectronic devices are larger than the pitch of the multichannel fibers. Size discrepancy inhibits optical communication modules from installing M optoelectronic devices on straight line extensions of the M element fibers of the M-channel ribbonfibers.

This application claims the priority of Japanese Patent Application No.2002-153870 filed on May 28, 2002, which is incorporated herein by reference.

2. Description of Related Art

Figure 5:
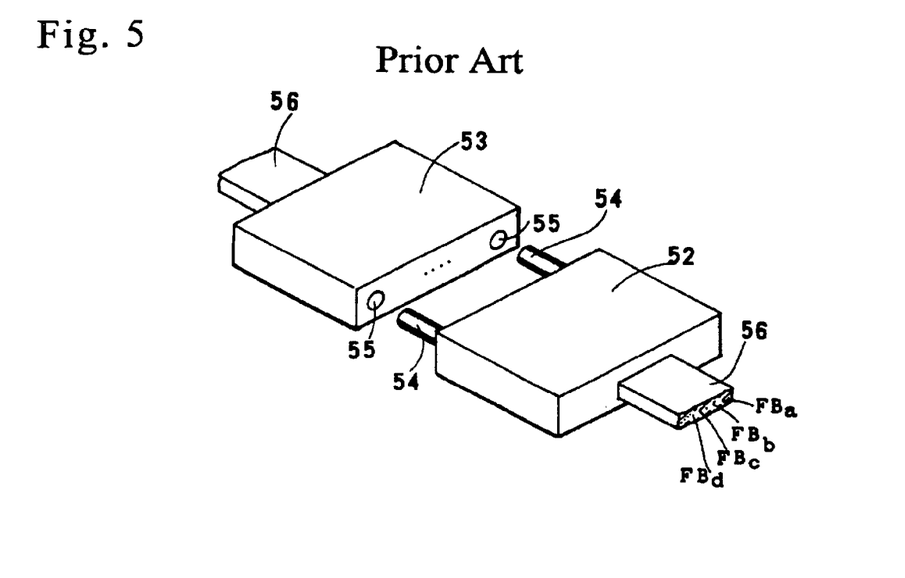
FIG. 5 is a perspective view of detached housings of four-channel ribbonfibers.

FIG. 5 shows an MT connector of a standard type of a four channel connector. A resin-made MT male connector 52 has a pair of guidepins 54 and 54 projecting from the front. The MT connector 52 contains a front end of a four-core ribbon fiber 56. The four-channel ribbonfiber 56 includes four optical fibers FBa, FBb, FBc and FBd. The standardized fiber pitch P1 of the ribbonfiber is 250 μm (0.25 mm). Four ends of the fibers appear on the front surface.

Another resin-made MT female connector 53 has a pair of guideholes 55 and 55 for joining to the above male connector 52. The MT connector 53 contains a four channel ribbonfiber 56 including four element fibers. Both connectors are combined or separated by the guidepins and holes. When the connectors 52 and 53 are coupled with each other by inserting the guidepins into the guideholes, each end of the element fibers of the connector faces an end of a counterpart fiber of another connector. The MT connector is one of low-cost, small-sized, prevalent connectors. The fiber pitch P1 is 250 μm. Laser diode chips or photodiode chips are squares or rectangles of a side of 600 μm to 300 μm. It is impossible for a multichannel fiber to join laser diodes or photodiodes to the element fibers with keeping the pitch P1.

① M. Shishikura, K. Nagatsuma, T. Ido, M. Tokuda, K. Nakahara, E. Nomoto, K. Sudoh and H. Sano, "10 Gbps× 4-channel parallel LD module", Proceeding of the 2001 IEICE, C-3-50, p160

Figure 6:
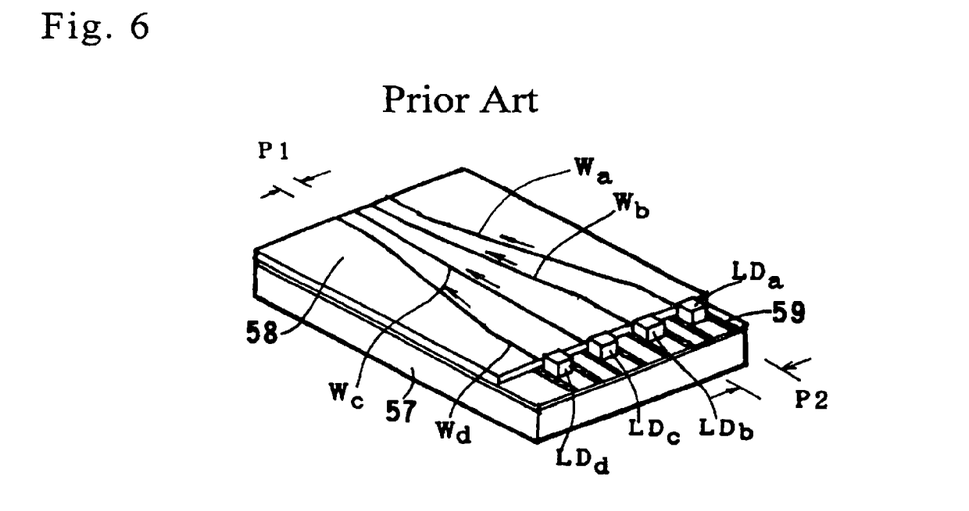
FIG. 6 is a perspective view of a 10 Gbps four channel LD module which proposed by ① M. Shishikura, K. Nagatsuma, T. Ido, M. Tokuda, K. Nakahara, E. Nomoto, K. Sudoh and H. Sano, "10 Gbps×4-channel parallel LD module", Proceeding of the 2001 IEICE, C-3-50, p160.

FIG. 6 shows a perspective view of a 10 Gbps four channel LD module with enlarging lightwaveguides proposed by ①. The LD module is made on a silicon bench 57 by piling a SiO$_2$ lightwaveguide layer on the silicon bench, producing four width enlarging lightwaveguides Wa, Wb, Wc and Wd having a 250 μm initial pitch and a 1000 μm final pitch and installing four laser diodes LDa, LDb LDc and LDd at final ends of the lightwaveguides at a 1000 μm pitch.

The initial pitch P1 of the lightwaveguides Wa, Wb, Wc and Wd is 250 μm for coinciding with the pitch of multichannel ribbon fibers which contain M element fibers at a 250 μm pitch. The initial 250 μm pitch allows the ribbonfiber to adhere to a front end of the lightwaveguides permanently. The final 1000 μm pitch allows individual laser diodes LDa, LDb, LDc and LDd to align at ends of lightpaths with sufficient margins. Smooth curvatures enlarge a width of the lightpaths continuously from the 250 μm pitch to the 1000 μm pitch on the silicon bench.

Parallel arrangement of a plurality of laser diode chips of a square from 600 μm to 300 μm requires a wide pitch more than 500 μm for the sake of thermal diffusion and a chip installment space. A wide pitch more than 1000 μm is preferable for depressing mutual crosstalk. The known reference ① enlarges the pitch of lightwaveguides continuously in the lateral direction along the lightpaths for solving the problem of the pitch discrepancy and the crosstalk.

The pitch P1 of multichannel fibers is different from a pitch P2 for aligning a plurality of lasers or photodiodes on a bench of a surface-mounting type module. A channel pitch should be enlarged midway on lightpaths from a ribbonfiber to a multichannel optical communication module. It is a good contrivance of enlarging the channel pitch by making curving lightwaveguides on a silicon bench like the known reference ①. However, it is difficult to produce the curving lightwaveguides on the silicon bench with high preciseness. Moderate curvature of a lightwaveguide requires a large length of the silicon bench. Alignment of lasers or photodiodes with lightwaveguides is a difficult step, which raises the cost of modules. A long silicon bench and built-in curving lightwaveguides enhance the cost since P1 and P2 have a difference.

One purpose of the present invention is to provide an optical communication device which enlarges the multichannel pitch without using of the high-cost curving lightwaveguides. Another purpose of the present invention is to provide a device which alleviates the length of the silicon bench. A further purpose is to provide a device which dispenses with a time-consuming alignment step for joining fibers to bench-built in lightwaveguides. A further purpose is to provide a device which can easily be attached to or detached from a prevalent multichannel MT connector.

The present invention proposes a communication device containing a connector having a pair of guidepins or guideholes, maintaining ends of a channel number of parallel optical fibers having tails extending from a rear wall, a bench (e.g., silicon bench) having M (M=channel number) parallel V-grooves aligning at a pitch P2 wider than a pitch P1 at a forward part, M linear lightwaveguides aligning at P2 and following the V-grooves and laser diodes or photodiodes mounted at ends of the lightwaveguides and a package including leadpins for supporting the connector, the fibers and the bench. The width of neighboring fibers is enlarged from P1 to P2 at an enlarging space ES between the connector and the silicon bench.

The discrepancy of the pitches P1 and P2 requires a pitch conversion element between the connector and the lasers or photodiodes. The present invention allows the optical fibers to bend freely at the enlarging space ES for converging the pitch instead of built-in lightwaveguides. Lightpaths align at P1 in the connector but align at P2 on the bench. The present invention enlarges the pitch by freely bending the fibers at the free space ES from the P1 pitch to the P2 pitch. The optical fibers curve with a locus consisting of two reciprocal arcs. The joint of two arcs is a neutral point without curvature. An elastic fiber yields optimum curvature in a freestanding state. Formation of curvatures in a free space enjoys high degree of freedom unlike formation of lightwaveguides on a silicon bench. It is easy to bend thin, elastic fibers in the free space.

The pitch-conversion portion (ES) exists out of the silicon bench in the device of the present invention. The bench does not contain the pitch conversion portion. The silicon bench should have parallel straight lightwaveguides and parallel straight V-grooves in the longitudinal direction. The silicon bench is immune from curved lines. A plurality of silicon benches can be made upon a silicon wafer by wafer process at a stroke.

The pitch-conversion should be done in a space in a package(case) but out of the (silicon) bench. The package should contain fiber pitch-expanding region. The fiber pitch-extending region may be a free space for allowing the pitch to extend in a free state. Since the fibers are held by the connector and the bench at both ends, the fibers bend into natural curvatures in the free state. The fibers are later fixed with a resin in the package. The curving portions are sustained by the resin stably without vibration in the package.

Alternatively, V-grooves can be prepared in the pitch-extending region in an inner case for guiding fibers in predetermined curvatures. The V-grooves determine the curvatures of the fibers. Arbitrary curvatures can be given to the fibers. Preparation of the V-grooves on the case is more facile than formation of curved lightwaveguides on a bench. The V-grooves can be formed, when the inner cases are produced by moulding. Fibers should be fitted into the V-grooves on the inner case and fixed with a resin.

Instead of the curvatures made on the inner case, a plurality of protrusions can be prepared on a bottom wall of the inner case for guiding fibers in predetermined curvatures. The protrusions determine the curvatures of the fibers. Like the V-grooves, the set of protrusions gives arbitrary curvatures to the fibers. In this case, the fibers should be fixed stably in the case with a resin.

250 $\mu$m is the fiber pitch P1 in MT connectors and ribbonfibers (tapefibers). The V-grooves or the lightwaveguides made on silicon benches have a pitch P2 of 500 $\mu$m to 1500 $\mu$m, which is determined by the necessary space of mounting laser diode or photodiode chips with adequate margins. An optimum pitch P2 should be chosen by taking account of the sizes of optoelectronic chips and suppression of crosstalk. Leadpins should have been built-in in package by insert-molding for wirebonding leadpins to the optoelectronic chips or metallized wirings. A connector and a silicon bench should be fitted into the inner case. A module is completed by encapsulating the connector, bench and the case into a plastic package by transfermolding with a rigid resin in a metallic mold.

SUMMARY OF THE INVENTION

This invention reconciles a wider chip-requiring pitch P2 with a narrower multichannel pitch P1 by curving fibers in a free space between a connector and a bench. Thin optical fibers, which are rich in elasticity by nature, enable modules to form a suitable curving multichannel paths in the free space. On the contrary, formation of curving dielectric lightwaveguides on the bench requires difficult fabrication and long benches, which leads to high cost modules. Instead of lightwaveguides, the present invention employs the optical fibers for changing pitches. The cost for curving lightpaths is zero in the case of fiber paths. Abundant elasticity of the fibers curtails the necessary length of the bench. Use of short benches allows the present invention to alleviate a rise of cost for multichannel modules. The bench can be made of silicon, ceramics or plastics. The cost reduction is conspicuous, in particular, for expensive single crystal silicon bench.

The present invention gives low-cost multichannel modules which harmonize the wide chip arrangement pitch P2 with the standardized channel pith P1 by assigning the optical fibers to making the curving lightpaths. Curving of the fibers in the free space is far easier than producing of curving lightwaveguides on the bench. Although the fibers bend in the free state, the fibers are fixed with an adhesive in a package. The curved fibers neither flutter nor flap in the module.

An available interface between a multichannel module and an outer multichannel network is a prevalent MT connector which has a pitch P1=250 $\mu$m=0.25 mm. The module ensures a sufficiently wide pitch P2=500 $\mu$m to 1000 $\mu$m for mounting laser or photodiode chips in an inner space of the package.

The present invention proposes low cost multichannel optical communication modules of high reliability and facile fabrication. The package can be formed by transfermolding the bench and the connector with a hard resin, which is suitable for mass scale production.

BRIEF DESCRIPTION OF DRAWINGS

FIG. 2(1) is a plan view and a sectional view of Embodiment 1 of the present invention including an MT connector, a free enlarging portion of fibers, a silicon bench with chips, a package and leadpins.

FIG. 2(2) is a sectional view of Embodiment 1 of the present invention including the MT connector, the free enlarging portion of the fibers, the silicon bench with the chips, the package and the leadpins.

FIG. 3(1) is a plan view and a sectional view of Embodiment 2 of the present invention including an MT connector, a pin-guiding enlarging portion of fibers, a silicon bench with chips, a package and leadpins.

FIG. 3(2) is a sectional view of Embodiment 2 of the present invention including the MT connector, the pin-guiding enlarging portion of the fibers, the silicon bench with the chips, the package and the leadpins.

FIG. 4(1) is plan views of an MT connector having multichannel fibers cut midway, gotten rid of cladding and separated as a starting part for producing an optical communication module of the present invention.

FIG. 4(2) is a plan view of a silicon bench having a set of V-grooves and a set of lightwaveguides as another starting part of making the module.

FIG. 4(3) is a plan view of the silicon bench having the set of V-grooves and the set of lightwaveguides and optoelectronic chips.

FIG. 4(4) is a plan view of a package with an aperture, recess, cavities, notch, walls and leadpins.

FIG. 4(5) is a plan view of the package with the aperture, recess, cavities, notch, walls and leadpins and the silicon bench encapsulated on a rear cavity.

FIG. 4(6) is a plan view of the package with the aperture, recess, cavities, notch, walls and leadpins, the silicon bench fitted in the rear cavity and the connector fixed on a front aperture.

FIG. 4(7) is a plan view of the package coated with a protecting resin.

FIG. 4(8) is a plan view of the module overall transfermolded with a hard resin.

DETAILED DESCRIPTION OF THE PREFERRED EMBODIMENTS

[1. Fundamental Structure (FIG. 1)]

Figure 1:
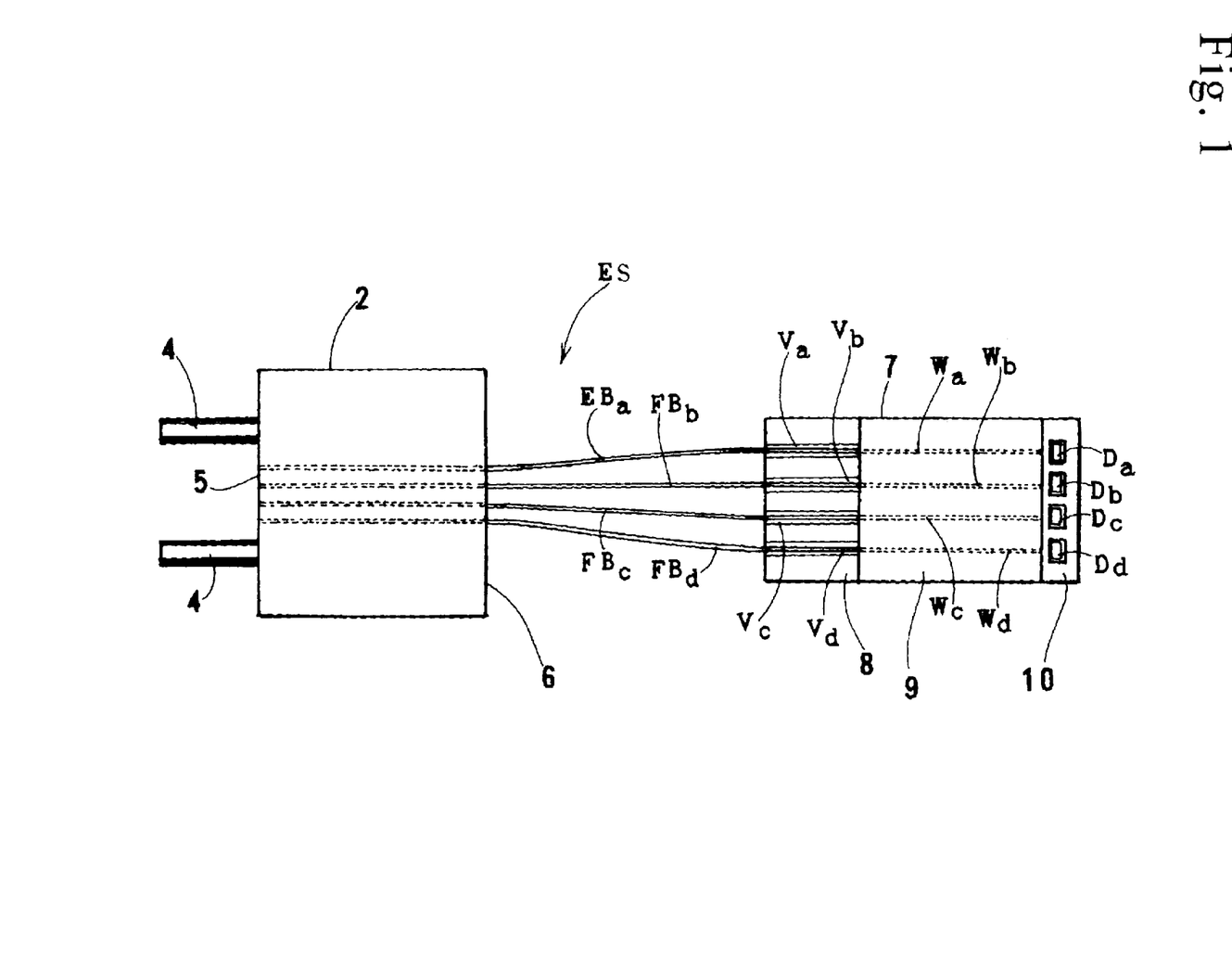
FIG. 1 is a plan view of a fundamental structure of an optical communication module of the present invention containing an MT connector, an enlarging portion of fibers and a silicon bench with chips.

FIG. 1 shows a fundamental structure of a multichannel optical module of the present invention. Multichannel ribbonfibers contain fibers of four cores, eight cores, twelve cores or sixteen cores, in general, M cores which are multiples of four. "M" denotes the number of channels. Element fibers are parallel in a flat layer in the ribbonfiber. An MT connector (ferrule) is a connector maintaining an end of the ribbonfiber for attaching to or detaching from modules. The MT connectors have four core type, eight core type, twelve core type or sixteen core type in accordance with the variety of ribbonfibers. A pitch P1 of the ribbonfibers and the MT connectors is 250 μm, which is a distance between centers of neighboring element fibers. Figures show a simple example of four cores. But this invention can also be applied to eight cores, twelve cores, sixteen cores, and other M cores.

An MT connector (MT ferrule) 2 has a resin body for keeping the ends of the fibers and guidepins or guideholes for attaching to or detaching from a module. Embodiment 1 employs a male connector with guidepins 4. But a reverse relation is also available.

A ribbonfiber following the MT connector 2 are cut at a determined distance from a rear surface of the connector 2. Element fibers FBa, FBb, FBc and FBd are isolated and separated by peeling plastic coating layers. A piece of the MT connector having four dangling tails is prepared.

A plurality of rectangular silicon benches should preliminarily been made on a silicon wafer at a stretch by wafer process. All the benches, which have similar structures, are produced by a similar way in the wafer process. Then production of a single bench is described. Four parallel straight V-grooves Va, Vb, Vc and Vd are made with a wide pitch P2 at a front part 8 of a silicon bench 7 by anisotropic etching. Four parallel straight lightwaveguides Wa, Wb, Wc and Wd following the V-grooves Va, Vb, Vc and Vd are formed on middle and rear regions 9 of the silicon bench 7 with the wide pitch P2. A lower rear end 10 of the silicon bench 7 has metallized pads. Optoelectronic device chips Da, Db, Dc and Dd are mounted upon the metallized pads. The optoelectronic devices Da, Db, Dc and Dd mean four channel laser diodes, four channel photodiodes or so.

A plurality of optical fibers extend from the back face of the MT connector 2. The pitch of the fibers is enlarged in a free width enlarging space ES in a package. The pitch P1 of fibers at the front end 5 of the connector 2 is 250 μm. The enlarging space ES increases the pitch from the narrow first pitch P1 to the wide second pitch P2, which is the parallel pitch on the silicon bench 7, of 500 μm to 1500 μm.

Parallel V-grooves and parallel lightwaveguides are made at the wide pitch P2 on the silicon bench. The wide pitch P2 allows the module to mount the optoelectronic chips (lasers or photodiodes) Da, Db, Dc and Dd on extensions of the lightwaveguides with enough margins. The module is free from the curving lightwaveguides, which lowers cost. Exclusion of curving lightwaveguides shortens the necessary length of a bench. The lightwaveguides can not be curved rapidly with large curvature. If the curved lightwaveguids are formed on the bench, it is necessary to prepare a quite long bench for the curved ligthwaveguide.

FIG. 1 shows a fundamental structure of the present invention having a connector and a silicon bench. Actually, a package unifies and encloses the connector and the bench of FIG. 1 into a complete module.

[2. Bench]

The silicon bench 7 is an example for a bench. A metal bench, a resin bench and a ceramic bench are also available instead of a silicon bench. The metallic bench should be coated with insulating layer on a surface. Polyimide or liquid crystal polymer are suitable for making resin benches.

[3. Lightwaveguides]

Fluoric polyimide waveguides are preferably produced upon a resin bench. Silica ($SiO_2$/Ge—$SiO_2$) waveguides or fluoric polyimide waveguides are suitable for silicon benches, metallic benches or ceramic benches.

[4. V-grooves]

V-grooves are made upon forward half of the bench for sustaining fiber tails following the connector. V-grooves can be formed by molding in the case of a resin bench. In the case of a ceramic bench, molding produces V-grooves. Etching prepares V-grooves upon a metallic bench. In the case of a silicon bench, anisotropic etching makes V-grooves with rigorous orientations. In any cases, fiber tails are naturally aligned to lightwaveguides by the V-grooves, which reduces the cost of production.

[5. Channel Number M]

The channel number M is a multiple of four, for example, four, eight, twelve, sixteen. Ribbon fibers and a MT connector contain the same number of element fibers. The present invention can be applied to any kind of multichannel tapefiber or MT connector.

[6. Optoelectronic Device Chip Pitch P2]

The pitch P2 should be enough wide for mounting optoelectronic devices with sufficient margins. As mentioned before, laser diode chips or photodiode chips are squares having a side between 600 μm and 300 μm. A pitch P2=500 μm of lightpaths allows the bench to mount chips of a size of 300 μm to 400 μm with a margin. Another pitch P2=1000 μm enables the module to lay chips of a size of 500 μm with a sufficient gap. Chip pitch P2 can be chosen to be P2=500 μm to 1500 μm by contriving sets of different path lengths.

[7. Optoelectronic Devices D]

Optoelectronic devices mean either photodiodes or laser diodes. A four channel module sometimes contains a set of four lasers LDa, LDb, Ldc and LDd which align along a lateral line on the bench. The module is a parallel four-channel LD module. Another type of a module contains a set of four photodiodes PDa, PDb, PDc and PDd as optoelectronic devices, which is a parallel four-channel PD module.

[8. MT connector (MT ferrule)]

A MT connector which attaches to or detaches from the module is either male connector having guidepins or a female connector having guideholes.

[9. Package]

A package(case) maintains and protects the connector, bench, optoelectronic devices, wires and leads. The connector is combined to the bench by the package. The fibers curving in a free space ES between the connector and the bench with changing mutual distances are protected by the package. The free space is either a completely vacant space or a quasi-vacant space with protrusions or bending grooves.

[1. Embodiment 1 (FIG. 2)]

FIGS. 2(1) and (2) show Embodiment 1 of the present invention. FIG. 2(1) is a horizontally sectioned plan view of Embodiment 1 having a package, an MT connector and a silicon bench which are enclosed by a molding resin (a protecting resin is omitted). FIG. 2(2) is a vertically sectioned side view of Embodiment 1 filled with the protecting resin and encapsulated with the molding resin. FIG. 2 shows the package and the resins in addition to the fundamentals appearing in FIG. 1. A MT connector 2 has a ribbonfiber containing a set of parallel element fibers (M=4), ends 5 of which appear on a front at a 250 $\mu$m pitch (P!). A pair of guidepins 4 project out of the front of the MT connector 2. Four fibers FBa, FBb, FBc and FBd, which are tails of the element fibers kept in the connector 2, extend out of a rear of the MT connector 2. A silicon bench 7 has longitudinal parallel V-grooves Va, Vb, Vc and Vd formed at a front region. In the case of a (001) single crystal silicon bench, anisotropic etching enables the silicon bench to produce the V-grooves with walls slanting at 54.7 degrees. A middle region of the silicon bench 2 is provided with four parallel lightwaveguides Wa, Wb, Wc and Wd aligning at a pitch of P2. The lightwaveguides are, for example, produced by making a 10 $\mu$m thick $SiO_2$ undercladding layer on the silicon bench, forming a $GeO_2$ doped $SiO_2$ core of a 6 $\mu$m×6 $\mu$m square, overlapping the core and the undercladding with a 10 $\mu$m thick $SiO_2$ overcladding layer and eliminating front and rear parts of the $SiO_2$ layers. The silicon bench 7 has a lower region 10 at the rear. The rear region 10 has metallized patterns. Optoelectronic device chips Da, Db, Dc and Dd are mounted on the metallized patterns at the pitch of P2.

A package 20 is made from plastics or ceramics. The package 20 has a bottom wall 22, a front wall 23, side walls 24 and 25 and a back wall 26. The bottom wall 22 has a connector recess 27 at a front part and a bench cavity 28 at a backward part. The front wall 23 has a notch 29 at the middle part for sustaining the connector. The connector recess 27, the bench cavity 28 and the connector notch 29 are formed for leveling the height of the fibers in the connector 2 with the heights of the fibers in the package and on the bench. A plurality of leadpins La, Lb, Lc, Ld . . . extend from a back of the package 20. One optoelectronic chip may requires two leadpins. A common source pin or separated source pins are allotted to the chips. The number and allocation of leadpins can be arbitrarily designed. Insert-molding can produce a plastic package unified with the leadpins. Wirebonding connects the metallized patterns and pads of the device chips with the leadpins.

A middle region (Enlarging part ES) of the bottom wall 22 has curving grooves Ga, Gb, Gc and Gd for enlarging the widths between neighboring fibers. Without grooves, the fibers bend in natural curvatures in a free space. But Embodiment 1 controls the curvature of the fibers by making the curving grooves.

Middle parts of the fibers FBa, FBb, FBc and FBd are embedded into the curving grooves Ga, Gb, Gc and Gd and are glued to the grooves with an adhesive which has elasticity even after hardening. Tails of the fibers FBa, FBb, FBc and FBd are buried and fixed with an adhesive in the parallel longitudinal V-grooves Va, Vb, Vc and Vd on the silicon bench 2. Tail ends of the fibers are in contact with front ends of the lightwaveguides Wa, Wb, Wc and Wd. Lengths of the tails of FBa and FBd are different from lengths of FBb and FBc. FIG. 2(1) denotes an intermediate step of providing the package with the silicon bench 7 and the connector 2. A glass plate 30 are stuck to the front region of the silicon bench 7 for protecting junctions of the fibers and the lightwaveguides.

The package 20 is filled with a transparent protecting resin 32. An outer plastic shell 35 is produced by transfer-molding the package with an epoxy resin in a metallic die.

Dimensions are described. The pitch P2 of the lightwaveguides Wa, Wb, Wc and Wd is 0.5 mm (P2=500 $\mu$m). The V-grooves Va, Vb, Vc and Vd aligning with a 500 $\mu$m pitch have a width enough to sustain a 125 $\mu$m $\phi$ fiber. The pitch P1 of the ribbonfiber in the connector is 0.25 mm (P1=250 $\mu$m).

Fibers expanding from the connector are cut to tails of an about 10 mm length. Width of the tails are enlarged by the curving grooves Ga, Gb, Gc and Gd from P1=250 $\mu$m to P2=500 $\mu$m. Embodiment 1 features the pitch-conversion curving grooves Ga, Gb, Gc and Gd for determining fiber positions on the enlarging region ES.

The outer molding resin 35 has a lateral width of 11 mm. The inner plastic package 20 has a width of 10 mm. The width of the MT connector 2 is 6.4 mm. The thickness of the resin 35 is 6 mm. The thickness of the plastic package 20 is 5 mm.

The MT connector 2 has a length of 8 mm. The length of the fibers extending from the back of the connector is about 10 mm. The length of the plastic package 20 is 25 mm. The length of the outer resin 35 is 30 mm.

Figure 3:
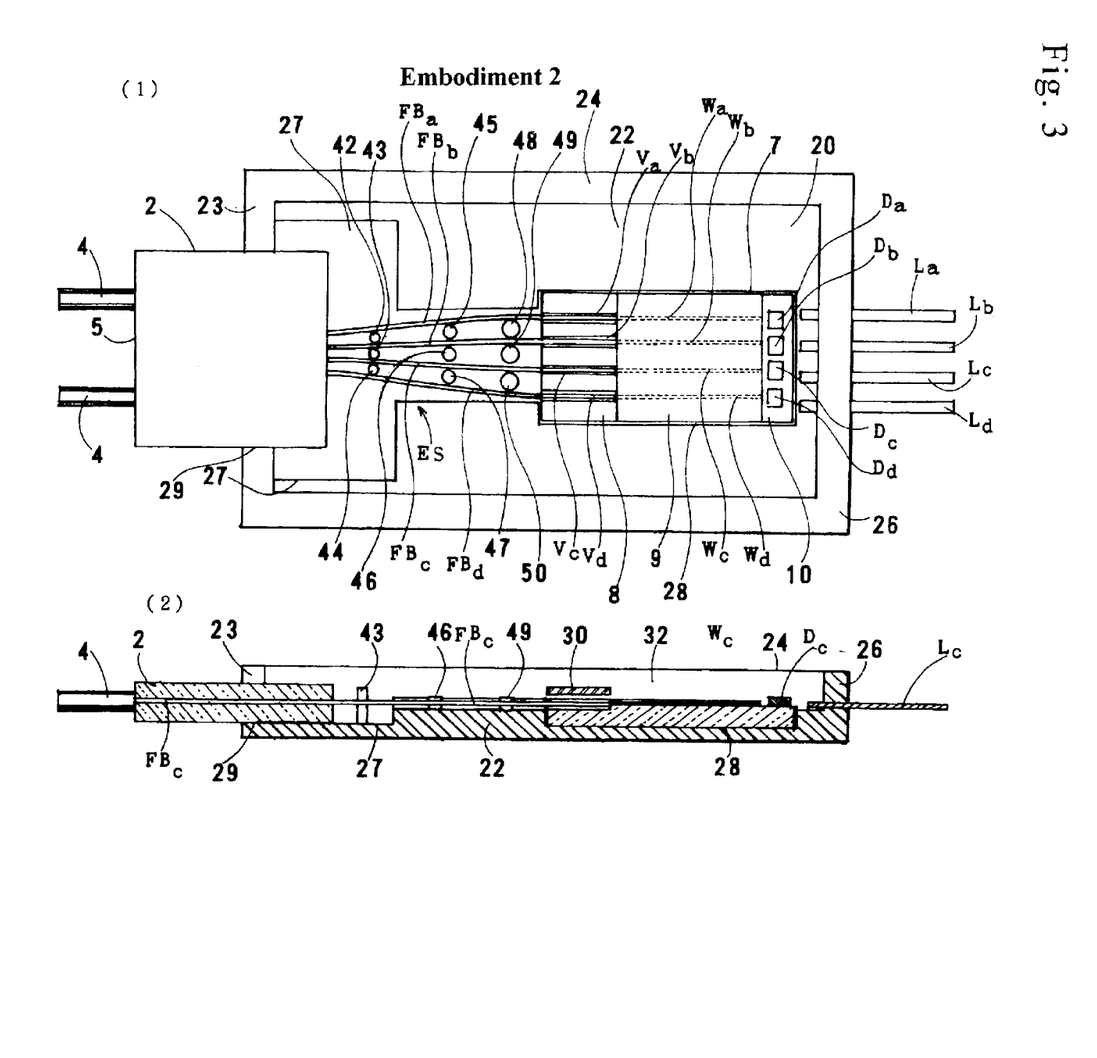
Figure 4:
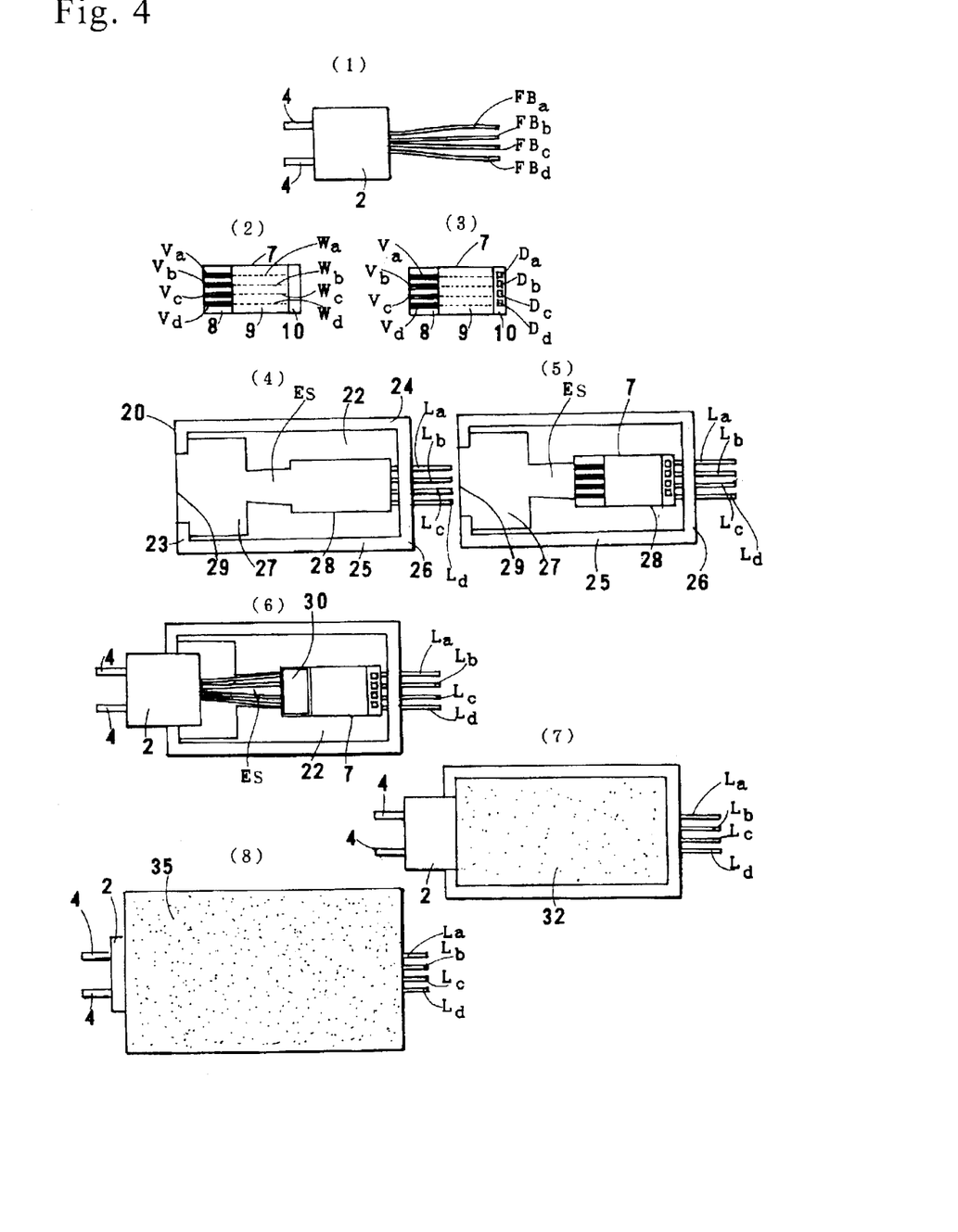

[2. Embodiment 2 (FIG. 3)]

FIG. 3 (1) and FIG. 3(2) show Embodiment 2. FIG. 3(1) is a plan view having an MT connector, a package, a silicon bench and leadpins. FIG. 3(2) is a sectional view of the same. A protecting resin and an outer resin are omitted in the figures, because they are quite similar to Embodiment 1. The enlarging space ES of Embodiment 1 had the curving grooves for guiding the optical fibers. Embodiment 2 allocates an enlarging space ES with plurality of protrusions for curving smoothly fibers. Other elements of embodiment 2 are similar to Embodiment 1.

Ends of the optical fibers are exposed on a front 5 of the connector 2 at a 250 $\mu$m pitch (P1). The MT connector 2 has two guidepins 4 on the front. Fibers FBa, FBb, FBc and FBd extend from the back of the connector 2.

Parallel longitudinal V-grooves Va, Vb, Vc and Vd are formed upon a front region of a silicon bench 7 at a 500 $\mu$m pitch (P2=500 $\mu$m).

Parallel lightwaveguides Wa, Wb, Wc and Wd are formed at the 500 $\mu$m pitch on a middle region 9 of the silicon bench 7 following the V-grooves.

A lower rear region 10 of the silicon bench 7 has metallized patterns. Optoelectronic device chips Da, Db, Dc and Dd are installed upon the metallized pads of the rear portion of the silicon bench 7.

A package 20 has a bottom wall 22, a front wall 23, side walls 24 and 25 and a back wall 26. The bottom wall 22 has a front shallow connector-storing cavity 27. The bottom wall 22 has a shallow bench cavity 28. The front wall 23 has a connector-holding notch 29. The cavities 27, 28 and notch 29 are prepared for leveling the height of the fibers in the enlarging space with the height of the fibers on the bench 7. The package has a plurality of leadpins La, Lb, Lc and Ld extending from the back. The leadpins are unified in a body with the package by metal-inserting moulding. Top pads of optoelectronic chips, the metallized patterns and the leadpins are joined by wirebonding.

The example gives the package nine guiding protrusions at a middle on the bottom floor (Enlarging Space; ES) for regulating arrangement of curving optical fibers. A set of protrusions 42, 43 and 44 nearest to the connector is smallest projections, whose separation is equal to or slightly larger than 125 μm (fiber diameter). Another set of middle protrusions 45, 46 and 47 is middle-sized projections, whose separation is larger than 125 μm. A final set of protrusions 48, 49 and 50 close to the Si bench is largest projections.

There is a correlation between positions and diameters of the protrusions which is determined for allocating desirable curvatures to the fibers. The example prepares three steps of projections. Tails of the cut fibers are inserted into gaps between the protrusions for depicting smooth curvatures. Ends of the fiber tails are embedded into the V-grooves formed on the forward region of the silicon bench. The fiber tails are glued to the V-grooves with an elastic resin even after hardening. The tails are pressed by a fiber-pushing plate 30.

Optical fibers would bend in natural curvatures without the guiding protrusions 42 to 50 like Embodiment 1. But Embodiment 2 forms nine protrusions on the package for positively regulating optical paths. The number of protrusions may be six, twelve or so instead of nine.

A protective resin 32 is supplied into the package 20. An outer shell is formed by transfermolding half products with an epoxy resin in a metallic die (omitted in the figures).

[3. Steps of Building Module (FIGS. 4(1)–(8))]

1. Cutting of Ribbonfiber: Separation of Element Fibers

A multichannel MT connector having a ribbonfiber containing element fibers is prepared. The ribbonfiber is cut at a point distanced with a length from a connector rear. An outercoating is eliminated from the cut ribbonfiber. The element fibers are separated into tails. FIG. 4(1) denotes four fiber tails FBa, FBb, FBc and FBd following the connector 2. The pitch P1 of the MT connector is 250 μm. Widths of the separated fiber tails can be freely determined. The connector 2 has either a pair of guidepins or a pair of guideholes on the front and four optical separated fiber tails on the back.

2. Preparation of the Silicon Bench

A lot of equivalent rectangular silicon benches are produced by a wafer processing on a large circular single-crystal silicon wafer. Many chips are assumed on the single crystal Si wafer. Quartz lightwaveguides with a pitch P2 are made by piling a silicon dioxide undercladding layer ($SiO_2$) on the silicon wafer, forming a square-sectioned $GeO_2$ doped $SiO_2$ core on the undercladding layer and forming an overcladding layer on the core and the undercladding layer. Alternately, a resin lightwaveguides can be made from fluoric polyimide. The pitch P2, which is larger than the P1, is 500 μm, 1000 μm, 1500 μm or so. Forward parts and backward parts of chips are eliminated by etching. Sets of parallel V-grooves with the pitch P2 are produced on the bare forward parts of assumed chips. Sets of metallized patterns are made on the rear parts of the assumed chips by printing, sputtering or metal-evaporation with photolithography. The steps of making the lightwaveguides, V-grooves and metallizes are done on wafer-processing. The silicon wafer is scribed and divided into a plurality of chips. FIG. 4(2) denoted a separated chip.

3. Mounting of Optoelectronic Device Chips

A set of optoelectronic device chips (lasers or photodiodes) are mounted upon metallizes on the rear part of the separateed chip. FIG. 4(3) shows a half-product provided with lasers or photodiodes Da, Db, Dc and Dd. The process till FIG. 4(3) can be also done on the wafer-processing alternatively.

4. Preparation of Package

FIG. 4(4) denotes a package 20 which is made from plastics or ceramics. The package is a rectangular case having a bottom wall 22, a front wall 23, side walls 24 and 25 and a rear wall 26. The package 20 has parallel leadpins La, Lb, Lc and Ld at a back which are unified to the package by insert-molding. The package 20 has a bench cavity 28, a connector cavity 27 and a connector notch 29 which have been produced at a stroke by the molding. Three parts, i.e., the silicon bench, the package and the connector, have been prepared.

5. Encapsulating of Silicon Bench

A silicon bench 7 is fixed with a resin in the bench cavity 28 of the package as shown in FIG. 4(5). Pads of the device chips (LDs or PDs) are joined to leadpins by wirebonding.

6. Provision of an MT Connector

An MT connector 2 is inserted and fixed in the connector cavity 27 and the connector notch 29 of the package 20. Free tails of fibers Fba, FBb, FBc and FBd are expanded at the enlarging part ES on the package. The tails are inserted and fixed in the V-grooves Va, Vb, Vc and Vc on the bench 7 with a transparent resin. Ends of the fibers face ends of the lightwaveguides. A glass plate 30 is fitted upon the junction. FIG. 4(6) shows the plan view of a half-product after the described steps.

7. Filling of Package with Protecting Resin

A protecting resin 32 is supplied in an inner space of the package 20 for protecting the fibers, optoelectronic devices and pattern from outer forces, humidity or corrosive gases. The protecting resin should be filled at the height of the top of the walls and be hardened. A resin which keeps elasticity after hardening is suitable for the protecting resin for prohibiting external shocks from cutting fibers. Joints between the fibers and the lightwaveguides and joints between the lightwaveguides and the device chips should be covered with a transparent resin. Except the joints, the protecting resin may be a black resin containing a black pigment for reducing inter-channel optical crosstalk. FIG. 4(7) denotes a half product filled with the protecting resin.

8. Molding with Resin (e.g., Epoxy Resin Molding)

An outer shell is formed by transfermolding the half-product in a metallic die with a hard resin, for example, epoxy resin which includes optionally a black pigment. The outer resin mold 35 contains the package, silicon bench, MT connector, chips and fibers. The epoxy resin excels in cost, rigidity, endurance, water-proofness and airtight sealing. The outer resin should be opaque for shielding inner devices from outer noise light. FIG. 4(8) denotes the resin-molded completed module. The leadpins La, Lb, Lc and Ld, a part of the MT connector, the guidepins project outward from the outer shell.

[4. Minimum Curvature Radius Rm and Longitudinal Length L of the Width Enlarging Region]

Figure 7:
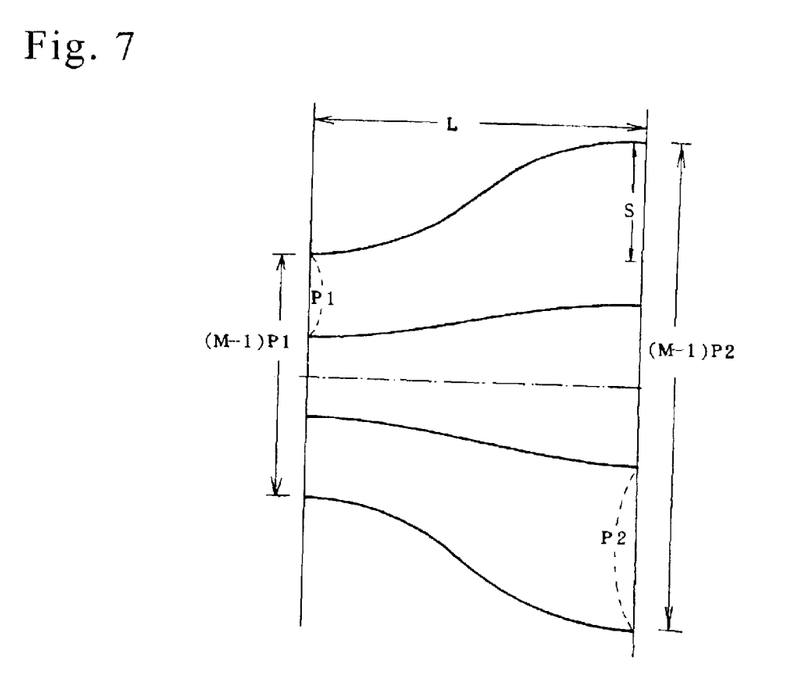
FIG. 7 is an explanatory figure of M curving fibers aligning at a narrower initial pitch P1 on a front line and at a wider final pitch P2 on a back line distanced by L from the front line for clarifying that ends of an outer fibers deviate by S=(M−1)(P2−P1)/2 in the lateral direction.

FIG. 7 shows curvatures of fibers at the width enlarging region. When an allowable minimum curvature radius Rm is predetermined for fibers, the relation between the allowable minimum radius Rm and the least longitudinal length of the enlarging region L is described. FIG. 7 denotes four fibers of outermost ones and next outermost ones in a M-channel case. (M-4) inner fibers are omitted in the figure. The beginning pitch is denoted by P1. The final pitch is denoted by P2.

The outermost fibers, which bend at the strongest curvature, determine the least necessary longitudinal length Lm of the enlarging region. The total lateral breadth at a staring line (at a rear end of a connector) is (M−1)P1. The distance between a central line and the outermost fiber is (M−1)P1/2 at the beginning. The entire lateral breadth at the final line is (M−1)P2. The distance between the central line and the outermost fiber at the final line is (M−1)P2/2. The lateral deviation S of the outermost fiber between the beginning line and the final line is, $$S=(M-1)(P2-P1)/2 \quad (1)$$

The longitudinal distance between the beginning line and the final line is denoted by "L". Both at the starting spots and the final spots the fibers are parallel to the axial line. The fibers bend twice at a middle region. The allowable minimum curvature radius has been predetermined. Consideration of the outermost fibers gives the least minimum longitudinal length Lm. There are a variety of modes of curvatures. Simple examples of a twin reverse equivalent arc case and a free bending case are considered.

[a. Twin Reverse Equivalent Arc Case (FIG. 8)]

Figure 8:
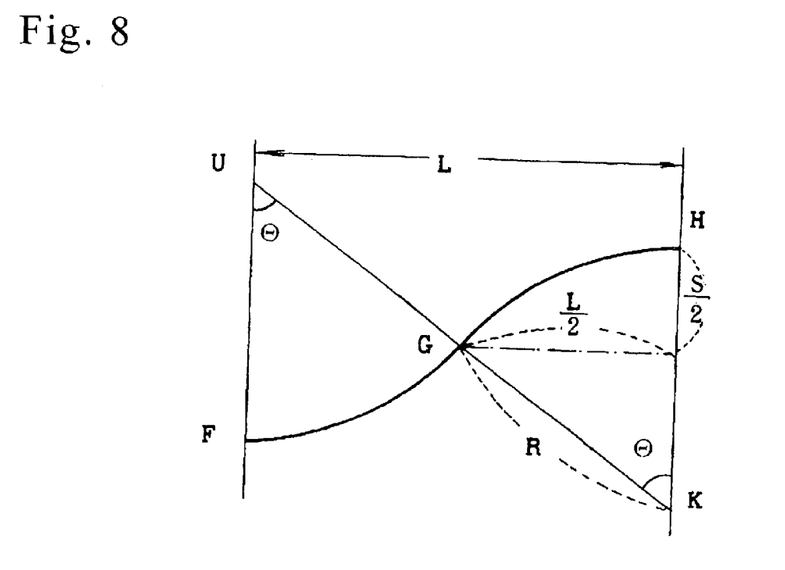
FIG. 8 is an explanatory figure of a double-circular curving fiber crossing an initial line at F and crossing a back line at H with a lateral deviation S and a longitudinal length L for determining the least allowable length Lm for a predetermined allowable curvature R.

This case assumes that the outermost fiber depicts two reverse arcs of an equal curvature radius R as shown in FIG. 8. A first arc FG, which is concave upward, has the radius R and an arc angle Θ. A second arc GH, which is convex upward, has the same radius R and the same arc angle Θ. Both arcs FG and GH have a longitudinal length L/2 and a lateral deviation S/2. The arc angle Θ is given by, $$\sin \Theta = L/2R. \quad (2)$$

$$\cos \Theta = (R-S/2)/R. \quad (3)$$

Since $\sin \Theta = \{1-\cos^2 \Theta\}^{1/2}$, $$L=2R\{1-(1-S/2R)^2\}^{1/2}. \quad (4)$$

$$L=\{(2R)^2-(2R-S)^2\}^{1/2}. \quad (5)$$

$$L=(4RS-S^2)^{1/2}. \quad (6)$$

Eqs.(4), (5) and (6) are identical as an expression of the length L of the curving region. When an optical fiber is forcibly bent, dissipation loss occurs. There is an allowable minimum curvature radius Rm for the optical fiber. An actual radius R should be larger than Rm in any case. Eqs.(5) and (6) give the shortest allowable length Lm of the curving region, $$L=\{(2R)^2-(2Rm-S)^2\}^{1/2}. \quad (7)$$

$$Lm=(4RmS-S^2)^{1/2}. \quad (8)$$

Eq.(7) and Eq.(8) are identical for the allowable minimum Lm of the length L. The shortest allowable length Lm depends upon the minimum curvature radius Rm.

Since S is far smaller than Rm in Eq.(8), the least allowable length Lm is approximated by $$Lm=(4RmS)^{1/2}. \quad (9)$$

Above equations are general expression for Lm. Allowable lengths L should satisfy an inequality $$L \geq \{(2Rm)^2-(2Rm-S)^2\}^{1/2}, \quad (10)$$

Or $$L \geq (4RmS-S^2)^{1/2}. \quad (11)$$

A quartz single mode fiber, for example, has a allowable minimum bending radius Rm=30 mm. Then substituting 4Rm=120 mm into Eq.(8) and Eq.(9) produces concrete expression of the least allowable length Lm.

$$Lm=(120S-S^2)^{1/2}. \quad (12)$$

Since $S^2$ is far smaller than 120S in Eq.(12), Lm is reduced to a simpler form $$Lm=(120S)^{1/2}. \quad (13)$$

For example, when P1=0.25 mm, P2=0.5 mm and M=4, the lateral deviation S of the outermost fiber is S=0.375 mm. For S=0.375 mm, the least length Lm of the curving region is $$Lm=6.7 \text{ mm}. \quad (14)$$

For another example, when P1=0.25 mm, P2=0.75 mm and M=4, the lateral deviation S of the outermost fiber is S=0.75 mm. For S=0.75 mm, the least length Lm of the curving region is $$Lm=9.5 \text{ mm}. \quad (15)$$

For a further example, when P1=0.25 mm, P2=1.00 mm and M=4, the lateral deviation S of the outermost fiber is S=1.125 mm. For S=1.125 mm, the least length Lm of the curving region is $$Lm=11.6 \text{ mm}. \quad (16)$$

For a further example, when P1=0.25 mm, P2=1.50 mm and M=4, the lateral deviation S of the outermost fiber is S=1.875 mm. For S=1.875 mm, the least length Lm of the curving region is $$Lm=15.0 \text{ mm}. \quad (17)$$

Figure 2:
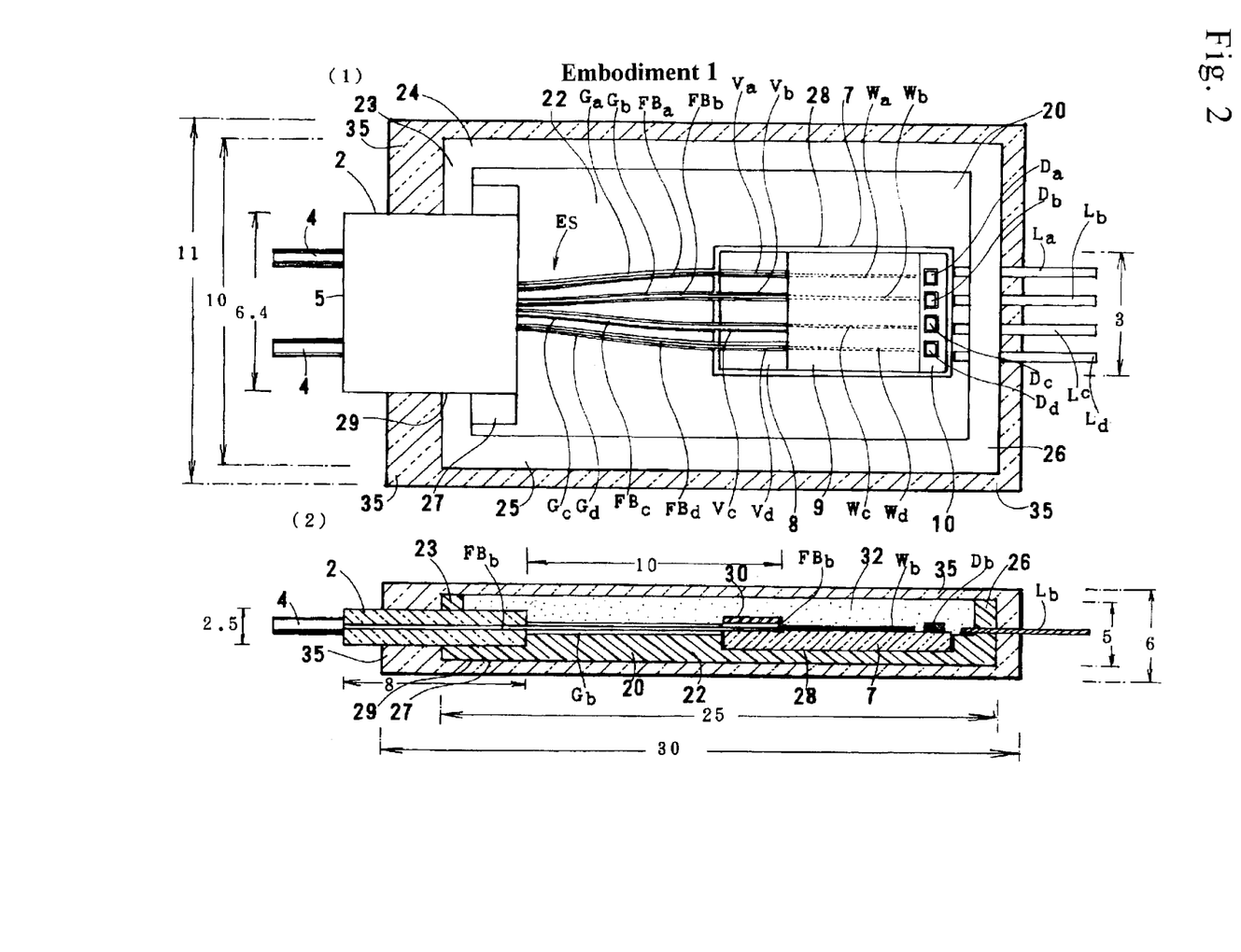

The twin reverse equivalent arc mode is not realized in a natural, free state. Locus of the twin arcs is produced by pushing fibers into the curving grooves or into gaps between the protrusions formed on a package as shown in FIG. 2 of Embodiment 1 or FIG. 3 of Embodiment 2.

Figure 9:
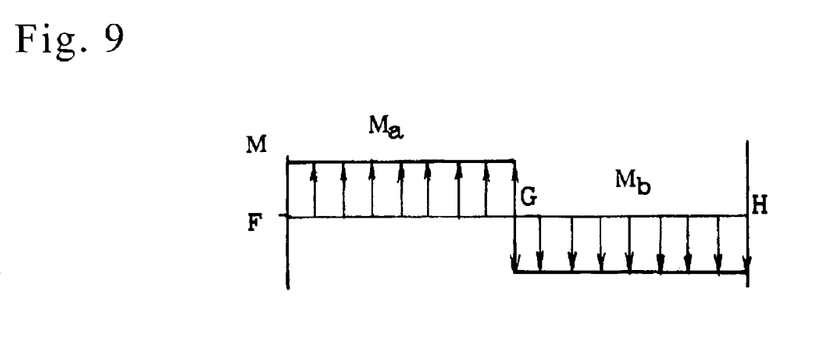
FIG. 9 is a bending moment diagram along a double-circular curving fiber for indicating discontinuity at a middle point of the fiber.

FIG. 9 is a bending moment diagram for inducing the twin equivalent reverse arcs. A bending moment M takes a positive constant value Ma between F and G and takes a negative constant value Mb (=−Ma) between G and H. The bending moment M is discontinues at G.

[b. Freestanding Curving Fiber Case (FIG. 10 and FIG. 11)]

Figure 11:
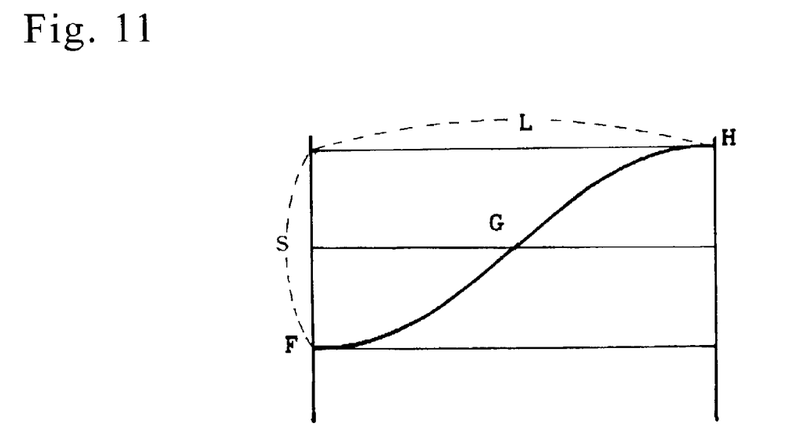
FIG. 11 is an explanatory figure of a free-standing curving fiber crossing an initial line at F and crossing a back line at H with a lateral deviation S and a longitudinal length L for determining the least allowable length Lm for a predetermined allowable curvature R.

The above-described twin-arc curvature mode gives the least length Lm for the predetermined allowable least curving radius Rm. This is a typical case. Grooves or protrusions are prepared for guiding fibers in a twin-arc curvature. However, this invention can dispense with grooves or protrusions in a freestanding fiber case as shown in FIG. 11. The free state bending is the simplest case for practical fabrication, because the freestanding determination requires neither grooves nor protrusions. Curvature radii of the outermost fibers should be larger than the minimum allowable curvature radius Rm anywhere.

Figure 10:
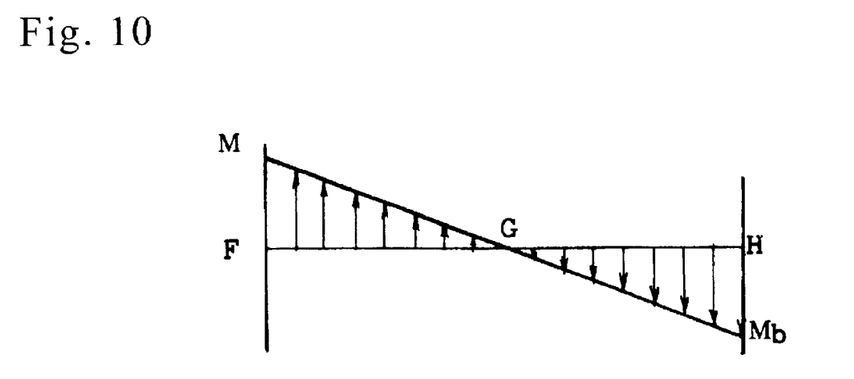
FIG. 10 is a bending moment diagram along a free-standing curving fiber for indicating allover continuity of the bending moment.

Assigning fibers to bend freely means that bending moments and forces are given only at beginning and final ends and neither moments nor forces are applied to an intermediate region. Curvature radii are minimum at the beginning and final ends and infinitely large at the middle point. FIG. 10 denotes a bending moment graph acting in an optical fiber in a freestanding state. A bending moment M is predetermined at both ends. The bending moment continually changes in an intermediate region without external moments or forces. The curvature radius R is related to the bending moment with an equation of $$\frac{M}{IE} = \frac{1}{R}. \quad (18)$$

Here I is a section second moment and E is a Young modulus of an object fiber. Signs of curvature radii(R) are defined positive for downward convexes and negative for upward convexes. Signs of bending moments(M) are defined positive for downward convexes and negative for upward convexes. As shown in FIG. 11, a bending moment Ma at a starting spot F is positive and another bending moment Mb at a finishing end H is negative. Two dimension coordinates are defined by assigning an origin O to point F, "x" to the horizontal direction and "y" to the vertical direction. A second derivative of y differentiated by x is a curvature (1/R) which is an inverse of a curvature radius R.

$$\frac{d^2 y}{dx^2} = \frac{1}{R}. \quad (19)$$

As shown in FIG. 10, the bending moment distribution of the freestanding fiber should be a first order function of x. The bending moment M at an arbitrary intermediate point is given by $$M = \{Ma(L-x) + Mbx\}/L. \quad (20)$$

Since no extra moment acts on the freestanding fiber except Ma and Mb, the sum of Ma and Mb should be zero.

$$Mb = -Ma. \quad (21)$$

Substitution of Eq.(21) into Eq. (20) gives the moment Ma definite expression of $$M = Ma(L-2x)/L. \quad (22)$$

$$\frac{d^2 y}{dx^2} = \frac{Ma(L-2x)}{LIE}. \quad (23)$$

Integration of Eq.(23) under an initial condition of θ=0 at x=0 gives an inclination angle θ of the object fiber.

$$\frac{dy}{dx} = \theta = \frac{Ma(Lx-x^2)}{LIE}. \quad (24)$$

The largest inclination angle $\theta_M$ occurs at x=L/2 (middle point G).

$$\theta_M = MaL/IE. \quad (25)$$

Integration of Eq.(24) under an initial condition of y=0 at x=0 yields locus FGH (y(x)) of the fiber, $$y = Ma(3Lx^2 - 2x^3)/6LIE. \quad (26)$$

Since y=S at the final end H of x=L, $$S = MaL^2/6IE. \quad (27)$$

Substituting Eq.(27) into Eqs.(19) and (23), we obtain a definite expression of curvature 1/R.

$$\frac{1}{R} = \frac{6S(L-2x)}{L^3}. \quad (28)$$

This is an equation giving a curvature radius R of a fiber as a function of x in a freestanding state. The curvature 1/R is similar to FIG. 10.

The least necessary fiber length Lm is a result of the initial curvature at x=0 and the final curvature at x=L taking the allowable least curvature radius Rm. Substituting x=0 into Eq.(28) gives the least fiber length Lm as a function of least curvature radius Rm.

$$1/Rm = 6S/Lm^2. \quad (29)$$

The least necessary fiber length Lm is give by $$Lm = (6SRm)^{1/2}. \quad (30)$$

This example of the freestanding type gives the least length Lm which is about 1.22 times as long as the Lm of the twin-arc curvature type of Eq.(9). When Rm=30 mm and M=4, Lm is about 10 mm in Eq. (30). The freestanding type, which dispense with preparation of curving grooves or serial protrusions, has an advantage of reducing cost by curtailing the operation of inserting fibers into grooves or so.

What we claim is:

1. An optical communication device comprising;
   a connector having guidepins or guideholes and maintaining M parallel optical fibers FBa, FBb, FBc, FBd, ... aligning at a first pitch P1 and having tails extending backward:
   a bench having M parallel V-grooves Va, Vb, Vc, Vd, ... aligning with a second pitch P2 wider than P1 for sustaining the tails of the fibers:
   M parallel lightwaveguides Wa, Wb, Wc, WD, ... aligning with the pitch P2, following the V-grooves and having rear ends:
   optoelectronic device chips mounted behind the rear ends of the lightwaveguides on the bench, the optoelectronic device chips being either either laser diodes or photodiodes: and
   a package maintaining the connector at a forward part, the tails of the fibers FBa, FBb, FBc, FBd, ... laterally expanding from the P1 pitch to the P2 pitch at a width enlarging region ES of a length L and the bench at a backward part,
   wherein the optical fibers between the connector and the bench have a curvature of a twin-arc mode which contains two equivalent arcs with the same curvature radius coupled in a reverse direction, and the number M of the fibers, the first pitch P1, the second pitch P2, the length L of the width enlarging region ES and the least allowable curvature radius Rm satisfy an inequality of $$L \geq (4RmS)^{1/2},$$

where $$S = (M-1)(P2-P1)/2.$$

2. The optical communication device according to claim 1, wherein the width enlarging region ES in the package has curving grooves into which the fibers are pushed and fixed.

3. The optical communication device according to claim 2, wherein the width enlarging region ES in the package is covered with a protecting resin.

4. The optical communication device according to claim 3, wherein the connector which is held by the package for maintaining ends of the fibers is an MT connector (MT ferrule).

5. The optical communication device according to claim 4, wherein the connector, the package, the fibers, the bench and the optoelectronic device chips are encapsulated by an outer resin which is formed by transfermolding of a hard resin.

6. The optical communication device according to claim 1, wherein the width enlarging region ES in the package has set of width enlarging protrusions with increasing diameters for receiving the fibers in recesses between the protrusions.

7. The optical communication device according to claim 6, wherein the width enlarging region ES in the package is covered with a protecting resin.

8. The optical communication device according to claim 7, wherein the connector which is held by the package for maintaining ends of the fibers is an MT connector (MT ferrule).

9. The optical communication device according to claim 8, wherein the connector, the package, the fibers, the bench and the optoelectronic device chips are encapsulated by an outer resin which is formed by transfermolding of a hard resin.

10. An optical communication device comprising:
a connector having guidepins or guideholes and maintaining M parallel optical fibers FBa, FBb, FBc, FBd, ... aligning at a first pitch P1 and having tails extending backward:
a bench having M parallel V-grooves Va, Vb, Vc, Vd, ... aligning with a second pitch P2 wider than P1 for sustaining the tails of the fibers:
M parallel lightwaveguides Wa, Wb, Wc, WD, ... aligning with the pitch P2, following the V-grooves and having rear ends:
optoelectronic device chips mounted behind the rear ends of the lightwaveguides on the bench, the optoelectronic device chips being either either laser diodes or photodiodes: and
a package maintaining the connector at a forward part, the tails of the fibers FBa, FBb, FBc, FBd, ... laterally expanding from the P1 pitch to the P2 pitch at a width enlarging region ES of a length L and the bench at a backward part,
wherein curvature of the optical fibers between the connector and the bench is a twin-arc mode which contains two equivalent arcs with the same curvature radius coupled in a reverse direction and the number M of the fibers, the first pitch P1, the second pitch P2, the length L of the width enlarging region ES and the least allowable curvature radius Rm=30 mm satisfy an inequality of $$L \geq (120S)^{1/2},$$

where $$S=(M-1)(P2-P1)/2.$$

11. The optical communication device according to claim 10, wherein the width enlarging region ES in the package has a set of width enlarging protrusions with increasing diameters for receiving the fibers in recesses between the protrusions.

12. The optical communication device according to claim 11, wherein the width enlarging region ES in the package is covered with a protecting resin.

13. The optical communication device according to claim 12, wherein the connector which is held by the package for maintaining ends of the fibers is an MT connector (MT ferrule).

14. The optical communication device according to claim 13, wherein the connector, the package, the fibers, the bench and the optoelectronic device chips are encapsulated by an outer resin which is formed by transfermolding of a hard resin.

15. An optical communication device comprising:
a connector having guidepins or guideholes and maintaining M parallel optical fibers FBa, FBb, FBc, FBd, ... aligning at a first pitch P1 and having tails extending backward:
a bench having M parallel V-grooves Va, Vb, Vc, Vd, ... aligning with a second pitch P2 wider than P1 for sustaining the tails of the fibers:
M parallel lightwaveguides Wa, Wb, Wc, WD, ... aligning with the pitch P2, following the V-grooves and having rear ends:
optoelectronic device chips mounted behind the rear ends of the lightwaveguides on the bench, the optoelectronic device chips being either either laser diodes or photodiodes: and
a package maintaining the connector at a forward part, the tails of the fibers FBa, FBb, FBc, FBd, ... laterally expanding from the P1 pitch to the P2 pitch at a width enlarging region ES of a length L and the bench at a backward part,
wherein curvature of the optical fibers between the connector and the bench is a freestanding mode which holds both ends of the fibers in parallel to the direction of the V-grooves and allows the fibers to bend freely in an intermediate space, and the number M of the fibers, the first pitch P1, the second pitch P2, the length L of the width enlarging region ES and the least allowable curvature radius Rm satisfy an inequality of $$L \geq (6RmS)^{1/2},$$

where $$S=(M-1)(P2-P1)/2.$$

16. The optical communication device according to claim 15, wherein the width enlarging region ES in the package is covered with a protecting resin.

17. The optical communication device according to claim 16, wherein the connector which is held by the package for maintaining ends of the fibers is an MT connector (MT ferrule).

18. The optical communication device according to claim 17, wherein the connector, the package, the fibers, the bench and the optoelectronic device chips are encapsulated by an outer resin which is formed by transfermolding of a hard resin.

* * * * *